(12) United States Patent
Kokolakis et al.

(10) Patent No.: US 11,850,578 B2
(45) Date of Patent: Dec. 26, 2023

(54) METHOD AND APPARATUS FOR PERFORMING A CHEMICAL REACTION UNDER ELEVATED PRESSURE

(71) Applicant: BASF SE, Ludwigshafen (DE)

(72) Inventors: Simon Kokolakis, Ludwigshafen (DE); Rocco Paciello, Ludwigshafen (DE); Annebart Wentink, Bishop, TX (US); Albert Werner, Bishop, TX (US)

(73) Assignee: BASF SE, Ludwigshafen (DE)

( * ) Notice: Subject to any disclaimer, the term of this patent is extended or adjusted under 35 U.S.C. 154(b) by 198 days.

(21) Appl. No.: 17/272,546

(22) PCT Filed: Sep. 17, 2019

(86) PCT No.: PCT/EP2019/074895
§ 371 (c)(1),
(2) Date: Mar. 1, 2021

(87) PCT Pub. No.: WO2020/058283
PCT Pub. Date: Mar. 26, 2020

(65) Prior Publication Data
US 2021/0322941 A1    Oct. 21, 2021

(30) Foreign Application Priority Data

Sep. 17, 2018 (EP) ..................... 18194856

(51) Int. Cl.
*B01J 3/02* (2006.01)
*B01J 10/00* (2006.01)
(Continued)

(52) U.S. Cl.
CPC ................. *B01J 3/046* (2013.01); *B01J 3/00* (2013.01); *B01J 3/02* (2013.01); *B01J 10/00* (2013.01);
(Continued)

(58) Field of Classification Search
None
See application file for complete search history.

(56) References Cited

U.S. PATENT DOCUMENTS 2,880,076 A * 3/1959 Kircher, Jr. ............. C08F 14/06
422/132
6,642,420 B1 11/2003 Zehner et al.
(Continued)

FOREIGN PATENT DOCUMENTS

DE    19836807 A1    2/2000
DE    10035370 A1    3/2001
EP     1338333 A1    8/2003

OTHER PUBLICATIONS

International Application No. PCT/EP2019/074895, International Search Report and Written Opinion, dated Jan. 29, 2020.

*Primary Examiner* — Jennifer A Leung
(74) *Attorney, Agent, or Firm* — MARSHALL, GERSTEIN & BORUN LLP

(57) ABSTRACT

The invention relates to a method of performing a chemical reaction under elevated pressure. It is suggested that the method comprises the steps of pressurizing a first vessel (3) and a second vessel (5) with reactant-containing liquid and gas to a predetermined pressure, providing reaction conditions in one of the vessels (3, 5) such that the chemical reaction is effected and a product-containing liquid is obtained, withdrawing liquid from the respective vessel (3, 5) as reaction product when a predetermined amount of reaction product has formed, preferably after the chemical reaction in the respective vessel (3, 5) has concluded, and synchronously supplying reactant-containing liquid to the respective other vessel (3, 5), wherein the first and second vessels (3, 5) are in fluid communication by way of a gas (Continued)

Figure 1:
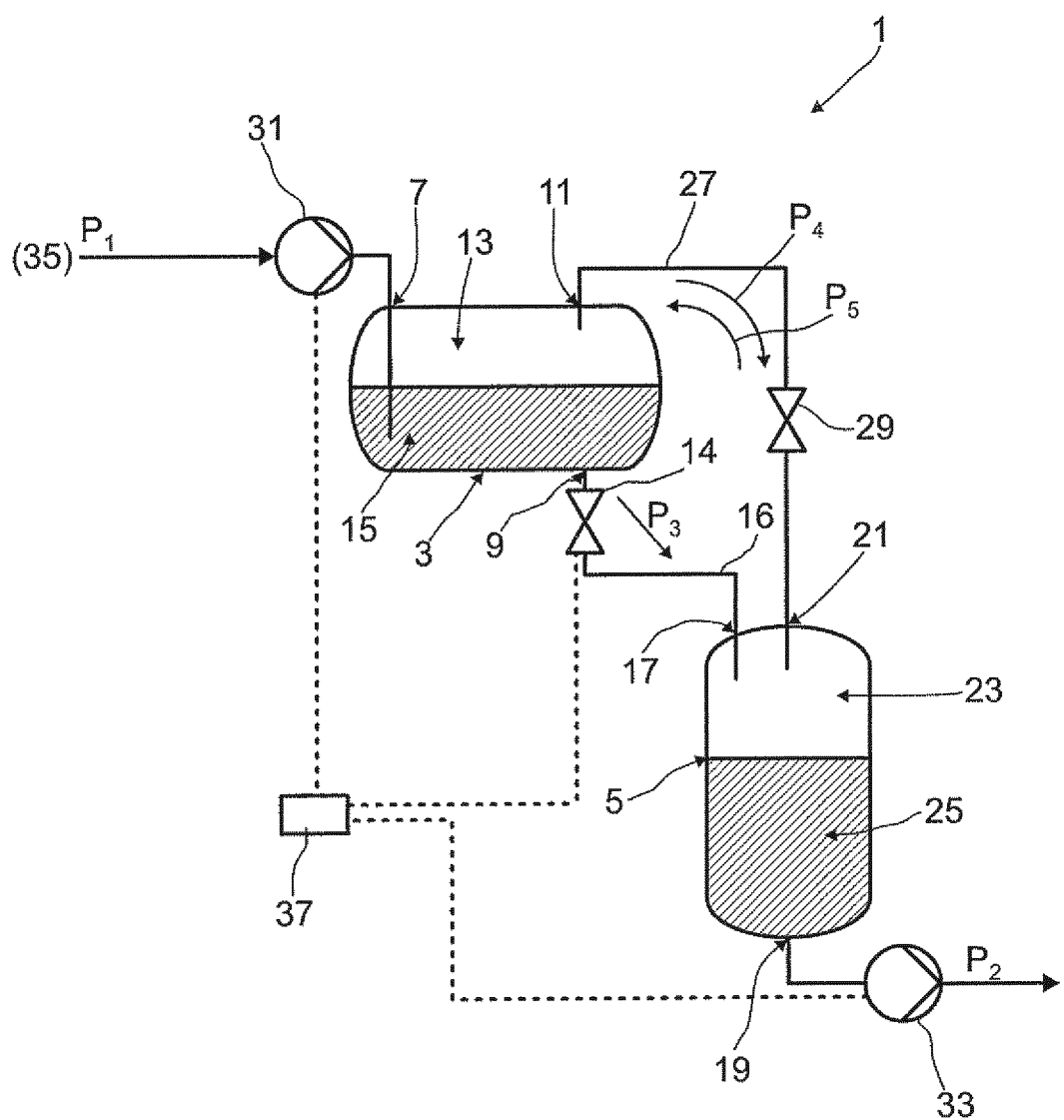

communication passage (27). The invention also relates to an apparatus and use thereof for performing said chemical reaction.

22 Claims, 4 Drawing Sheets

(51) Int. Cl.
    *B01J 19/24*     (2006.01)
    *B01J 3/04*     (2006.01)
    *B01J 3/00*     (2006.01)

(52) U.S. Cl.
    CPC ........... *B01J 10/007* (2013.01); *B01J 19/242* (2013.01); *B01J 19/245* (2013.01); *B01J 19/2445* (2013.01); *B01J 2219/00162* (2013.01)

(56) References Cited

U.S. PATENT DOCUMENTS

| | | | |
|---|---|---|---|
| 2012/0183450 A1* | 7/2012 | Scates | C07C 51/12 422/187 |
| 2014/0257007 A1 | 9/2014 | Bitterlich et al. | |
| 2015/0299079 A1* | 10/2015 | Fridag | B01J 19/24 568/454 |

\* cited by examiner

METHOD AND APPARATUS FOR PERFORMING A CHEMICAL REACTION UNDER ELEVATED PRESSURE

CROSS-REFERENCE TO RELATED APPLICATIONS

This is a National Stacie of International Application No. PCT/EP2019/074895, filed Sep. 17, 2019 (incorporated herein by reference in its entirety), which claims the benefit of European Application No. 18194856.3 (filed Sep. 17, 2018).

The invention relates to a method of and an apparatus for performing a chemical reaction under elevated pressure. Further, the invention relates to a method of and apparatus for performing carbonylation under elevated pressure.

Certain chemical reactions require or at least are facilitated by applying high pressures in the respective reactor vessels. A prime example of such reaction types is the carbonylation reaction. However, other chemical reaction types also potentially profit from being conducted under elevated pressure, for example hydrogenation or hydroformylation reactions.

Carbonylation reactions with carbon monoxide in the presence of a catalyst are generally known in the art. Such reactions include for instance hydroformylation reactions or formation of carboxylic acids or carboxylic ester compounds.

U.S. Pat. No. 4,329,507 describes that 1-(substituted aryl)propionic acids such as for instance flurbiprofen, fenoprofen, ketoprofen or ibuprofen can be obtained by carbonylation of the respective substituted aryl-ethylenes.

It is also known for instance from U.S. Pat. No. 4,694,100 to obtain 1-(p-isobutyl phenyl)propionic acid or its esters by reacting p-isobutylstyrene with carbon monoxide in the presence of a metal complex carbonylation catalyst.

U.S. Pat. No. 6,555,704 discloses a conversion of 1-(4'-isobutylphenyl) ethyl halides to the respective substituted propionic acid by reaction with carbon monoxide in the presence of a palladium catalyst.

WO 00/02840 also refers to conducting a palladium catalyzed carbonylation of olefinically substituted aromatic compounds with carbon monoxide in the presence of alcohol and/or water.

U.S. Pat. No. 8,921,591 describes a production process for phenylacetic acids by reacting toluene or substituted toluene by a carbonylation reaction in the presence of alcohols using a transition metal catalyst complex.

Such methods can also be used to produce racemates, pure chiral compounds, enantiomers or mixtures enriched with such an enantiomer.

In known industrial applications, ibuprofen is produced in single-vessel reactors at elevated pressures in the range of up to 10 MPa. In these applications, which generally function satisfactorily, the consumption of pressurised reactant-containing gas is considered to be a challenge. After a predetermined amount of reaction product has formed, preferably when the chemical reaction has concluded, product can be withdrawn either without dosing additional gas, or under isobaric conditions by use of additional amounts of gas. All superpositions between these two extrema are possible. In a first case, a pressure drop occurs, which is followed by a pressure surge when fresh starting material is introduced into the reactor. In a second case, major amounts of gas are needed when emptying a reactor in order to maintain a desired elevated pressure inside the reactor. Neglecting solubilities and density changes, the same amount of gas is then released, i.e. lost, when fresh starting material is subsequently introduced into the reactor. In processes which require isobaric additions over extended periods of time, pressure can only be maintained or restored by supplying large quantities of additional balance gas to the reactor vessel. Depending on the material cost of gas, the prior art procedures accordingly leave room for improvement as regards the cost efficiency.

Accordingly, it was an object of the invention to provide improvements for the initially mentioned methods and apparatuses that overcome the drawbacks found in the prior art as much as possible. In particular, it was an object of the invention to suggest a method and apparatus that can be operated more cost efficiently without sacrificing the yield of the chemical reaction performed under elevated pressure.

The invention achieves its object by suggesting a method as described herein. In particular, the invention suggests a method of performing a chemical reaction under elevated pressure, comprising the steps of: Pressurizing a first vessel and a second vessel with i) reactant-containing liquid and ii) gas to a predetermined pressure, providing reaction conditions in one of the vessels such that a chemical reaction is effected and a product-containing liquid is obtained, withdrawing product-containing liquid from the respective vessel when a predetermined amount of product has been produced, preferably when the chemical reaction has concluded, and simultaneously supplying reactant-containing liquid to the respective other vessel, wherein the first and second vessels are in fluid communication by a way of a gas communication passage. The invention is based upon the realisation that by having a second vessel in addition to a first vessel, and by having the two vessels communicate by way of the gas communication passage, the pressure drop in the reactor vessel is greatly reduced. When fresh reactant-containing liquid is replenished in one vessel while product-containing liquid is withdrawn from the other vessel, the difference in gas volume is substantially reduced to the difference of the amounts in liquid between the vessels, in addition to a (comparatively small) amount of gas that may still be soluble in the fresh reactant-containing liquid (referred to also as solubility loss).

Preferably, the first vessel and the second vessel are either intermediately or directly connected to a source of reactant-containing liquid, and liquid supply to the vessels is controlled such that when liquid is withdrawn from one of the vessels, synchronously liquid is also supplied to the respective other vessel, such that the total amount of liquid within both vessels remains substantially constant. If the same volumetric amount of liquid is replenished in one vessel that has been withdrawn in the other vessel, pressure inside both vessels is kept substantially constant (cf. solubility loss above) due to the gas communication passage in between the two vessels. The gas consumption is reduced to almost 0, with possible deviations therefrom potentially occurring due to solubility losses or a volume increase of the reaction product relative to the reactants. In principle, only the amount of gas which is used during the chemical reaction for the reaction itself needs to be replenished.

Accordingly, the method according to the invention is particularly beneficial to all types of processes which need to be performed under elevated pressure, and which benefit from isobaric conditions over extend periods of time, in particular in processes that encompass the preferably cyclical sequence of, (1) reaction of reactants in a reactor, and (2) transfer of reactants/products into/from the reactor. The benefits are achieved also if such processes additionally encompass at least one of heating, cooling or phase separation operations and/or which make use of expensive reactants, in particular expensive reactant-containing gases.

Under elevated pressure, the invention understands a pressure value above ambient pressure.

In a preferred embodiment of the invention, withdrawing the product-containing liquid is effected at a predetermined withdrawal flow rate, and supplying the reactant-containing liquid is affected at a predetermined feed flow rate, wherein the feed flow rate and withdrawal flow rate are substantially equal. By maintaining substantially the same predetermined flow rates for supplying as well as for withdrawing liquid from the system, pressure inside the two vessels is substantially isobaric. Under flow rate, the volumetric flow rate is understood.

The method preferably comprises the steps of: a) Monitoring at least one of the withdrawal flow rate and the feed flow rate; and regulating the flow rates by b) increasing one of the flow rates when the respective other flow rate increases, and c) decreasing one of the flow rates when the respective other flow rate decreases. The regulation step preferably is conducted such that the flow rate differential between the withdrawal and feed flow rates remains within a predetermined interval, preferably within 10%, more preferably within 5%, and particularly preferred within 1% of one another. Flow rate variations within these preferred tolerances are considered to be substantially equal.

Alternatively, or additionally to monitoring the flow rates, the invention suggests in a further preferred embodiment to maintain substantially isobaric conditions by monitoring the pressure inside the first and second vessels, and by
   i) increasing the feed flow rate and/or reduce the withdrawal flow rate if the pressure drops below the predetermined pressure, and
   ii) reducing the feed flow rate and/or increase the withdrawal flow rate if the pressure drops below the predetermined pressure.

Preferably, steps i) and ii) are performed when the pressure drops 10% or more below the predetermined pressure, more preferably 5% or more below the predetermined pressure, particularly preferred 1% below the predetermined pressure. Pressure variations that are within the preferred tolerances are understood to be substantially isobaric.

Preferably, the step of providing reaction conditions, such that the chemical reaction is effected and a product-containing liquid is obtained, is performed in the second vessel while preferably the first vessel is waiting to be filled with reactant-containing liquid, and the method further comprises the step of supplying reactant-containing liquid to the first vessel simultaneously to withdrawing the product-containing liquid from the second vessel. After withdrawing the product-containing liquid from the second vessel, fresh reactant-containing liquid is then transferred from the first vessel to the second vessel while pressurized gas is allowed to flow from the second vessel to the first vessel.

The method preferably provides the first vessel and the second vessel connected in series to one another, with the first vessel being upstream of the second vessel. The economic advantage of this embodiment is that only one vessel needs to be equipped with hardware to provide the reaction conditions while the other one can be designed as a mere buffer vessel.

Under "reaction conditions", parameters such as pressure, temperature and flow conditions are understood. Flow conditions can be provided by stirring means for example.

The step of supplying the reactant-containing liquid from the first vessel to the second vessel is effected by gravity. In order to accomplish this, it is considered preferable to arrange the first vessel such that the liquid outlet of the first vessel is located higher than the liquid inlet of the second vessel. By doing so, the liquid transport from the first vessel to the second vessel can be effected without additional fluid conveying means.

Alternatively or additionally, the step of supplying the reactant-containing liquid from the first vessel to the second vessel is effected by or assisted by a fluid conveying device, preferably a pump. This way, the transfer of the product-containing liquid from the first vessel to the second vessel can be actively effected by using a conveying device such as a pump. By doing so, the duration of the transfer procedure can be decreased. For active actuation, the liquid outlet of the first vessel does not necessarily have to be located higher than the liquid inlet of the second vessel which can be beneficial for limited build space conditions of a plant site.

In a further preferred embodiment, the step of providing reaction conditions such that the chemical reaction is effected and a product-containing liquid is obtained is alternatingly performed in both vessels. In this embodiment, both the first and second vessels are reactor vessels. Like in the aforementioned embodiment with a serial arrangement of the first and second vessel, this embodiment relies on the idea that while the chemical reaction is being effected in one of the vessels, reactant-containing liquid may already be held available in the respective other vessel. At the least, however, the vessel that does not perform the reaction is used as gas buffer volume.

When both vessels are "parallel" reactor vessels, it is unnecessary to transfer the reactant-containing liquid from one vessel to the other such that immediately after the chemical reaction in one vessel has concluded, or a predetermined amount of product has formed therein, and liquid is withdrawn from the vessel, the other vessel can be (re-)filled with reactant-containing liquid. The reaction in the other vessel can thus be started immediately after said vessel has been filled with reactant-containing liquid such that the delay of time in between two reaction procedures is minimized.

In another preferred embodiment of the invention, the method comprises the steps of determining if the pressure in the first and second vessels drops below the predetermined pressure, and replenishing pressurized gas to the first and second vessels until the predetermined pressure is reached again. Preferably, the step of replenishing gas to the first and second vessels is initiated when the pressure drops more 10% or more below the predetermined pressure, more preferably 5% or more of the predetermined pressure, particularly preferred 1% or more below the predetermined pressure. Pressure determination can be conducted manually or automatically. Preferably, if detection occurs automatically, the replenishing step is also controlled automatically by a corresponding control device.

According to a further preferred embodiment, and in particular in cases when after a predetermined amount of reaction product has formed, preferably when the reaction has concluded, the vessel contains several liquid phases, wherein preferably the reaction product resides in only a select number of the liquid phases, particularly in one liquid phase, the method further comprises the step of separately withdrawing a selected liquid phase or multiple phases, preferably with a dip tube extending to a predetermined depth of the vessel in particular to where the select number of liquid phases are expectedly located.

The method of the invention has hereinabove been described generally with respect to a chemical reaction that is performed under elevated pressure.

Further preferably, the chemical reaction to be effected is a carbonylation reaction. Carbonylation can be the last step of synthesizing for example isobutylphenyl propionic acid. The method thus comprises the steps of selecting and providing the reactants and reaction conditions such that carbonylation occurs.

In a preferred embodiment of the invention, the gas comprises a reactant-containing gas. Preferably, the reactant-containing gas comprises carbon monoxide for effecting the carbonylation procedure.

Particularly preferred, the reactant-containing gas additionally or alternatively comprises hydrogen for effecting a hydrofomylation reaction or hydrogenation reaction.

Further preferably, the reactant-containing liquid comprises an alcohol. Alcohol is understood to be an hydroxy group-containing compound.

The reaction product preferably is an organic acid, preferably a carboxylic acid, or a salt thereof. In other words, the reaction product preferably is a COOH group-containing organic compound.

In a further preferred embodiment, the reaction is effected in the presence of a catalyst. The catalyst preferably contains a metal selected from the group of transition metals. Particularly preferred, the catalyst is a palladium-containing catalyst.

Preferably, the elevated pressure applied during the method is a positive pressure in the range of 0.1 MPa to 100 MPa. Particularly preferred, said pressure is in the range of 1 MPa to 80 MPa. Further preferred, said pressure is in the range of 2 MPa to 30 MPa. Still further preferred, said pressure is in the range of 4 MPa to 20 MPa.

In preferred embodiments, the reaction conditions encompass a temperature in the range of 0° C. to 300° C. Preferably, the reaction conditions encompass an elevated temperature, meaning a temperature above ambient temperature. Further preferably, the elevated temperature is in the range of 50° C. to 200° C. Still further preferred, the elevated temperature is in the range of 100° C. to 150° C.

Preferably, in the method of the present invention (preferably in a method of the present invention designated hereinabove or hereinbelow as being preferred) there is produced a carbonylation product, a hydrogenation product or a hydroformylation product, wherein such product is a compound or a mixture comprising one or more compounds preferably selected from the group consisting of saturated or unsaturated organic acids, preferably carboxylic acids, more preferably aryl substituted propionic and acetic acids, wherein the aryl is a substituted or unsubstituted aryl group, or salts of such acids,
carboxylic esters,
aldehydes, and
alcohols,
preferably in the form of a racemate, chiral compound, enantiomer, or mixture enriched with such an enantiomer (i.e., having an enantiomeric excess),
wherein the product most preferably is isobutylphenyl propionic acid.

The method preferably comprises the steps of selecting and providing the reactants and reaction conditions such that a respective one of the above compounds is produced.

In a preferred subcombination of preferred embodiments discussed hereinabove, the invention suggests a method of producing a carbonylation product, a hydrogenation product or a hydroformylation product, preferably selected from the group of compounds mentioned hereinabove, the method comprising the steps of:
Pressurizing a first vessel and a second vessel with i) reactant-containing liquid comprising an alcohol and ii) a reactant-containing gas comprising at least one of a) carbon monoxide for effecting a carbonylation reaction, and b) hydrogen for effecting a hydrofomylation reaction, or a hydrogenation reaction,
to a predetermined pressure in the range of 0.1 MPa to 100 MPa, preferably in the range of 1 MPa to 80 MPa, further preferred in the range of 2 MPa to 30 MPa, still further preferred in the range of 4 MPa to 20 MPa,
providing a temperature in the range of 0° C. to 300° C., preferably an elevated temperature, further preferably in the range of 50° C. to 200° C., and still further preferred in the range of 100° C. to 150° C.,
such that a chemical reaction takes place and a product-containing liquid is obtained, wherein the reaction is effected in the presence of a catalyst, the catalyst preferably containing a metal selected from the group of transition metals, particularly preferred being a palladium-containing catalyst;
withdrawing product-containing liquid from the respective vessel when a predetermined amount of product has been produced, preferably when the chemical reaction has concluded, and
simultaneously supplying reactant-containing liquid to the respective other vessel, wherein the first and second vessels are in fluid communication by a way of a gas communication passage.

In a further preferred subcombination of the preferred embodiments, the invention suggests a method of producing isobutylphenyl propionic acid;
the method comprising the steps of:
Pressurizing a first vessel and a second vessel with i) reactant-containing liquid comprising an alcohol and ii) a reactant-containing gas comprising carbon monoxide for effecting a carbonylation reaction,
to a predetermined pressure in the range of 4 MPa to 20 MPa,
providing a temperature in the range of 100° C. to 150° C.,
such that a chemical reaction takes place and a product-containing liquid is obtained,
wherein the reaction is effected in the presence of a catalyst, the catalyst preferably containing a metal selected from the group of transition metals, particularly preferred being a palladium-containing catalyst;
withdrawing product-containing liquid from the respective vessel when a predetermined amount of the product has been produced, preferably when the chemical reaction has concluded, and
simultaneously supplying reactant-containing liquid to the respective other vessel, wherein the first and second vessels are in fluid communication by a way of a gas communication passage.

The method for producing isobutylphenyl propionic acid preferably comprises the conversion of isobutylbenzene by Friedel-Crafts-Acylation in the presence of a Lewis-acid to 4-isobutylacetophenone which is subsequently hydrogenated, for instance in the presence of a hydrogenation catalyst such as Raney nickel or a palladium catalyst, producing 1-(4-isobutylphenyl)ethanol. 1-(4-isobutylphenyl)ethanol is then converted in liquid phase to produce 2-(4-isobutlyphenyl)propionic acid by carbonylation with carbon monoxide under elevated pressure in the presence of a palladium-containing catalyst.

The invention has herein above been described in a first aspect with regard to the inventive method. In a second aspect, the invention solves the object mentioned herein above by suggesting an apparatus for performing a chemical reaction under elevated pressures as described herein.

In particular, the invention suggests an apparatus comprising a first vessel that is configured to be pressurized with a liquid and gas at a predetermined pressure and comprises at least one liquid inlet configured for receiving pressurized reactant-containing liquid, and a liquid outlet for withdrawing liquid from the vessel, and a second vessel that is configured to be pressurized with liquid and gas at a predetermined pressure and comprises at least one liquid inlet for receiving reactant-contained liquid, and a liquid outlet for liquid from the vessel, wherein at least one of the vessels is configured to provide reaction conditions, and the first vessel and the second vessel are connected to be in fluid communication by way of a gas communication passage. The invention makes use of the same advantages and shares the same preferred embodiments as the method described herein above in the first aspect. In order to avoid redundancy, it is thus referred to the description herein above.

Preferably, the first vessel and the second vessel are either intermediately or directly connected to a source of reactant-containing liquid, and liquid supply to the vessels is controlled such that when liquid is withdrawn from one of the vessels, simultaneously liquid is also supplied to the respective other vessel, such that the total amount of liquid within both vessels remains substantially constant.

In a preferred embodiment, the apparatus comprises a pump upstream of the liquid inlets of the first and second vessels, the pump being configured to transport liquid at predetermined flow rate, namely feed flow rate. Depending on which of the vessels is to be supplied with reactant-containing liquid, the pump is associated by corresponding valves and piping elements. The pump is preferably controlled manually or automatically to adapt the feed flow rate to the flow rate at which reaction product-containing liquid is withdrawn from the respective other vessel. For facilitating this, the apparatus preferably comprises a flow rate monitoring device associated with the liquid outlets of the reaction product-containing vessel or vessels.

Alternatively, or additionally, the apparatus comprises control valves associated with the liquid inlets of the vessels and outlets of at least the vessel or vessels containing the reaction product-containing liquid to regulate the feed flow rates and withdrawal flow rates to be substantially equal.

Preferably, the pump is a first pump and the apparatus further comprises a second pump downstream of the liquid outlet of the second vessel, the first and second pumps being configured to synchronously transport liquid at a predetermined flow rate.

In a further preferred embodiment, the first vessel is a buffer vessel, and the second vessel is a reactor vessel and at the liquid outlet of the first vessel is connected to be in fluid communication with the liquid inlet of the second vessel. In this embodiment, the first and second vessels are arranged in series.

Preferably, the apparatus mentioned herein above comprises a valve interposed between the liquid outlet of the first vessel and the second vessel, the valve being configured to be closed when liquid is withdrawn from the second vessel and synchronously supplied to the first vessel and to open communication for supplying liquid from the first vessel to the second vessel. The valve preferably is a control valve which is in signal communication with a control device.

Preferably, the liquid outlet of the first vessel is positioned above the liquid inlet of the second vessel. In this embodiment, transfer of liquid from the first vessel to second vessel can be effected by gravity developed need of additional conveying means in between the two vessels.

In an alternatively preferred embodiment, the first vessel and the second vessel both are reactor vessels. Preferably, the liquid inlets of the first and second vessels are then connected to inlet manifold, and the liquid outlets of the first and second vessels are connected to an outlet manifold.

Preferably, the first pump is arranged upstream of the inlet manifold, and the second pump is arranged downstream of the outlet manifold such that only one respective pump is required to supply fluid through the first and second vessels and withdrawing fluid from the first and second vessels. The first and second pumps are preferably in signal communication with the control device.

Further preferably, each liquid inlet of the first and second vessels is associated with an inlet valve, and each liquid outlet of the first and second vessels is associated with an outlet valve. The inlet valve of the first vessel preferably is configured to open and close synchronously with the outlet valve of the second vessel and the inlet valve of the second vessel is configured to open and close synchronously with the outlet valve of the first vessel. Preferably, the valves are respectively control valves that are in signal communication with the control device.

In a further preferred embodiment, the liquid outlet of at least one of the first and second vessels, in preferably both outlets of the first and second vessels, is associated with a dip tube extending into the respective vessel to a predetermined depth. The dip tube allows for removing a selected number of liquid phases from a plurality of liquid phases inside the vessels, depending on the depths of the dip tube inside the vessel.

In another preferred embodiment of the invention, at least one of the first and second vessels comprises a gas inlet for receiving pressurized gas, preferably reactant-containing gas, from a gas source. The dedicated gas inlet for receiving pressurized gas is helpful maintaining the gas pressure exactly the same inside the first and second vessels. In contrast to pure batch operations wherein a pressure drop inevitably occurs while emptying the reactor vessel, gas can now be continuously replenished during the reaction itself and also during the step of emptying the reactor.

While the synchronized liquid transfer between the two vessels already greatly reduces the overall gas consumption compared to prior art cases where a feed batch process was conducted to prevent pressure drops, it may still be necessary or desired to replenish small amounts of gas which are used in the chemical reaction itself and potential solubility losses.

Preferably, the dedicated gas inlet is associated with a control valve that is in signal communication with the control device. With respect to the control device being mentioned as a preferred option herein above, the apparatus preferably comprises such a control device that is operatively coupled with the first and second pumps and/or preferably with the respective valves associated with the first and second vessels, the pumps being associated with the liquid inlets and liquid outlets of the first and second vessels, and the control device being configured to synchronize the feed flow rate, i.e. amount, of liquid introduced into the first vessel with the withdrawal flow rate, i.e. amount, of liquid withdrawn from the second vessel, and the feed flow rate of liquid introduced into the second vessel with the withdrawal flow rate of liquid withdrawn from the first vessel. In other words, the control device is preferably configured to maintain the total amount of fluid within the first and second vessels substantially at a constant rate, and/or the pressure inside the first and second vessels substantially constant, by controlling the first and second pumps and/or by controlling the valves associated with the inlet and outlet of the first and second vessels. Preferably, the apparatus, and particularly preferred the control device, is configured to carry out the method of any one of the preferred embodiments described herein above.

For doing so, the control device preferably comprises processor means and a data storage, wherein the data storage contains computer program means that compare the method described according to anyone of the preferred embodiments described herein above into control signals for the first and second pumps and/or the control valves.

The first and second vessels of the apparatus discussed hereinabove are preferably configured to receive and to be resistant to alcohol, carbon monoxide and hydrogen as reactants. At least the reaction product-containing vessel or vessels are further preferred also configured to receive and resistant to carbonylation products, hydrogenation products or hydroformylation products as mentioned hereinabove.

Additionally or alternatively, the vessels of an apparatus according to the present invention are preferably configured to contain reactant-containing liquid, gas, and/or products as defined above, i.e. in particular alcohol, carbon monoxide and/or hydrogen as preferred starting materials. In preferred embodiments one or both of said vessels do contain, one, several or all of the aforementioned substances.

Preferably, one or both vessels of the apparatus are configured to contain or do contain one or more of said substances at a pressure in the range of 0.1 MPa to 100 MPa, preferably in the range of 1 MPa to 80 MPa, further preferred in the range of 2 MPa to 30 MPa, still further preferred in the range of 4 MPa to 20 MPa.

Further preferred, one or both vessels of the apparatus are configured to contain or do contain one or more of said substances at a temperature in the range of 0° C. to 300° C., preferably an elevated temperature, further preferably in the range of 50° C. to 200° C., and still further preferred in the range of 100° C. to 150° C.

In a third aspect, the invention also relates to the use of an apparatus as described herein above to produce a carbonylation product, a hydrogenation product or a hydroformylation product, preferably selected from the group identified hereinabove.

In order to avoid redundancy, again, reference is made to the description herein above for the advantages and preferred embodiments of the inventive use.

Hereinafter, the invention will be described in more detail with respect to the accompanying drawings with reference to preferred embodiments.

Figure 2:
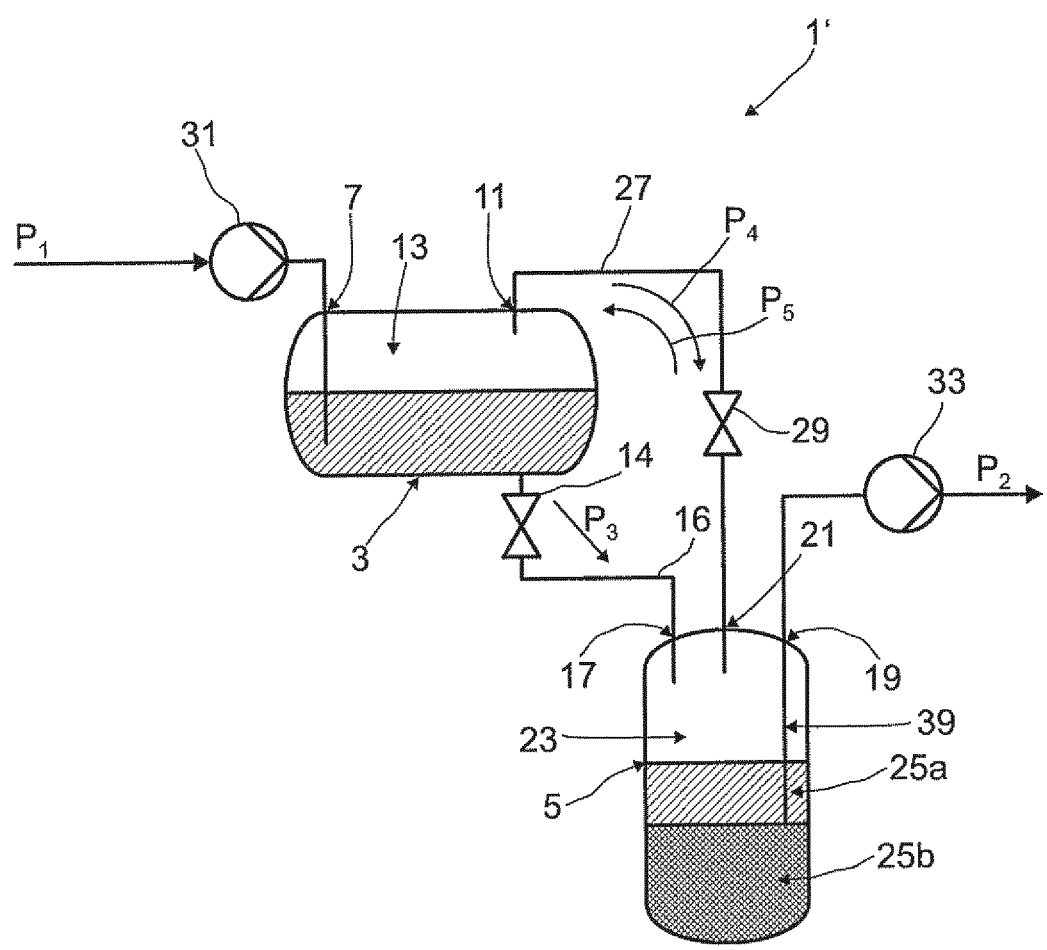
Figure 3:
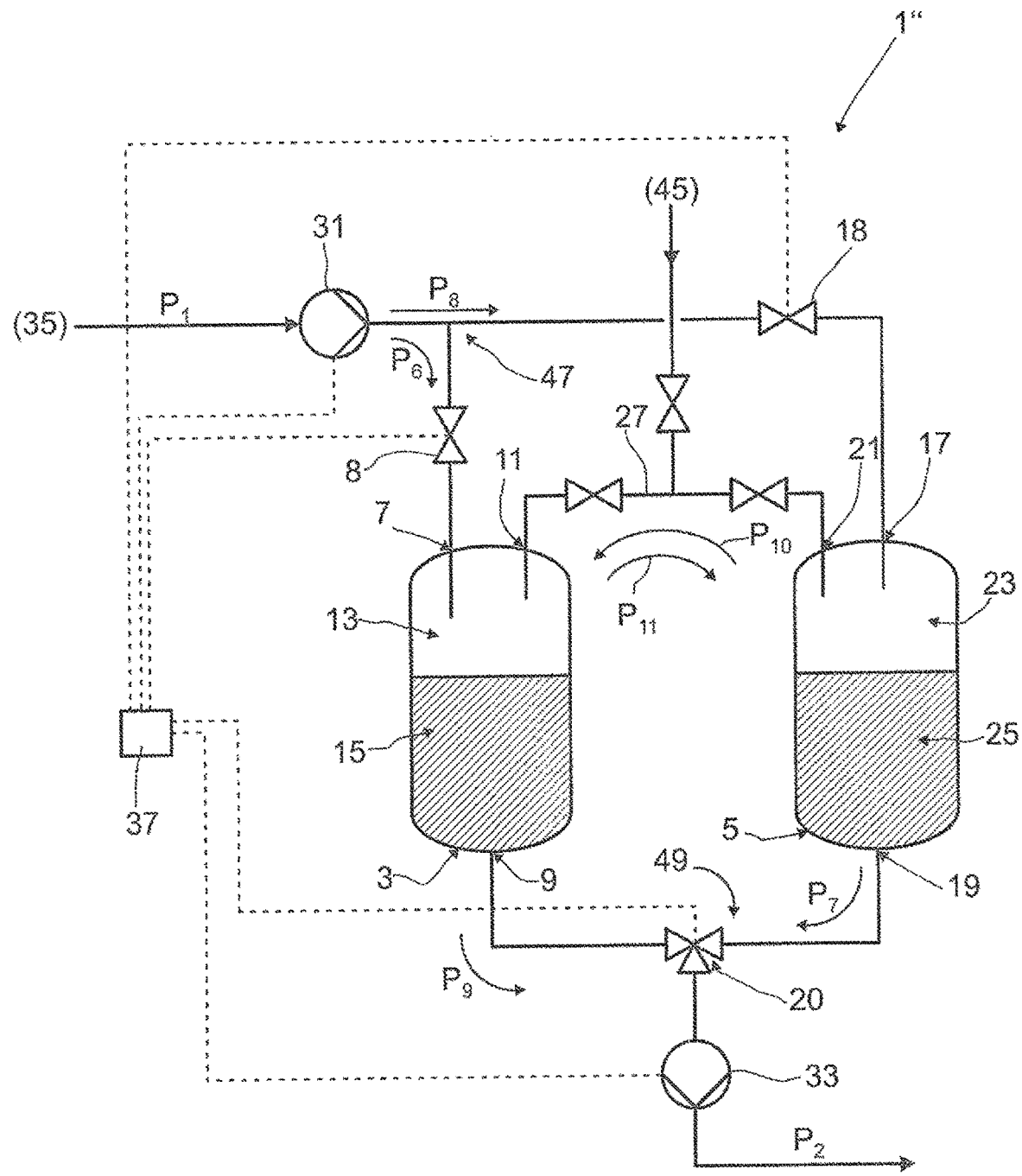
Figure 4:
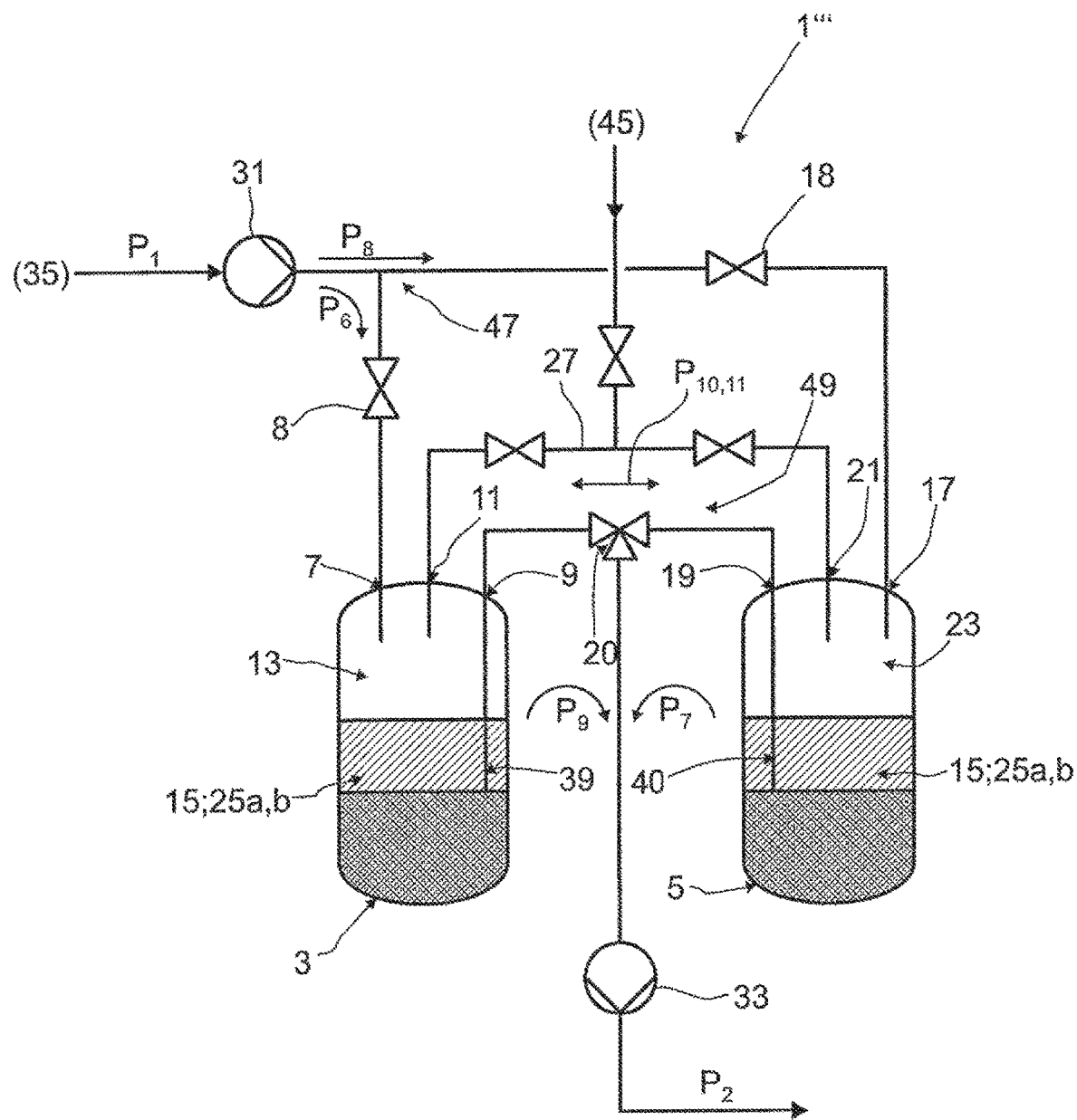

Herein,

FIG. 1: apparatus for performing a chemical reaction according to a first embodiment, FIG. 2: apparatus similar to the FIG. 1 in a second embodiment, FIG. 3: apparatus or performing a chemical reaction on the elevated pressure according to a third embodiment, and FIG. 4: apparatus similar to FIG. 3 in a fourth embodiment.

When describing the preferred embodiments, functionally or structurally identical elements have identical reference signs across the embodiments. It shall be understood that some features are only shown with respect one or a select number of embodiments while being omitted in the remaining embodiment or embodiments. However, the description of the preferred embodiments is to be understood in context with the description hereinabove. Embodiments of one figure can be combined with embodiments of other figures as far as they are covered by the above description and claimed subject-matter.

FIG. 1 shows an apparatus 1 for performing a chemical reaction under elevated pressure. The apparatus 1 is particularly designed for performing a carbonylation reaction of isobutylphenylethanol as a reactant-containing liquid and carbon monoxide as a reactant-containing gas. The apparatus 1 comprises a first vessel 3 and a second vessel 5. Both vessels 3, 5 are configured to receive pressurized liquid and gas at a predetermined pressure of for example 90 bar or above, preferably 150 bar and above.

The first vessel 3 comprises a liquid inlet 7 and a liquid outlet 9 positioned at respectively suitable portions of the first vessel 3. Exemplarily but not exclusively, the liquid inlet 7 is shown in an upper portion of the first vessel 3 while the outlet is shown in a lower portion of the first vessel 3. Further, the first vessel 3 comprises a gas port 11 connecting to the first vessel 3. Likewise, the gas port 11 is positioned suitably on the first vessel 3 and is exemplarily but not exclusively shown as positioned in the upper region of the vessel to avoid inadvertent liquid transfer through the gas port 11.

Inside the first vessel 3, a gas volume 13 extends above a liquid volume 15.

The second vessel 5 comprises a liquid inlet 17 and a liquid outlet 19, each positioned at a respective suitable position on the second vessel 5. Further, the second vessel 5 comprises a gas port 21. Inside the second vessel 5, a gas volume 23 extends above a liquid volume 25.

The gas ports 11, 21 of the first and second vessels 3, 5 are interconnected by a gas communication passage 27 such that the gas volumes 13, 23 may communicate freely with one another. The gas communication passage 27 optionally comprises a valve 29 which, however, normally is closed throughout the chemical reaction and open while filling and withdrawing from the vessels to allow free gas communication as well as while transferring the starting material from the buffer tank to the reactor. The valve 29 may also be closed for installation, deinstallation and maintenance purposes. If the first and second vessels 3, 5, and the type of reaction to be performed allow for the valve 29 to be open, the valve 29 does not need to be closed during the reaction. Having the valve 29 open during the reaction facilitates efforts to maintain a constant pressure inside both vessels 3, 5 by only having to feed pressurized gas to one of the vessels 3, 5 instead of both.

The liquid outlet 9 of the first vessel 3 is interconnected with the liquid inlet 17 of the second vessel 5 to be in fluid communication with one another. Interposed between the liquid outlet 9 and the liquid inlet 17 is a valve 14, which preferably is a control valve. The first and second vessels 3, 5 are connected by way of a liquid communication passage 16.

Upstream of the first vessel 3, a first pump 31 is associated with the liquid inlet 7 and configured to supply reactant-containing liquid from a source 35 thereof. Downstream of the second vessel 5, a second pump 33 is optionally connected with the liquid outlet 19 and configured to withdraw liquid from the second vessel 5. Said second pump 33 is particularly beneficial for performing reactions at the lower end of the inventive ranges of elevated pressure, e.g. at pressures below 4 MPa. For higher pressures, e.g. in the range of 9 MPa and above, the second pump can be omitted since the pressure inside the vessels 3,5 is sufficient for driving the liquid through the respective outlets.

In operation, liquid and gas communication between the first and second vessels 3, 5 occurs in the manner described below. Firstly, pressurized reactant-containing liquid and gas is supplied to the second vessel 5 which is a reactor vessel. The second vessel 5 is then operated by providing reaction conditions in the second vessel 5 such that the chemical reaction, which preferably is a carbonylation reaction, is effected in the second vessel 5, and a product-containing liquid is contained, the reaction product preferably being isobutylphenyl propionic acid. The chemical reaction is generally known in the art, and reference is made to the comments hereinabove.

After a predetermined amount of reaction product has formed, preferably when the reaction has concluded, in the second vessel 5, product-containing liquid has formed in the liquid volume 25 in the second vessel 5. The product-containing liquid is withdrawn through liquid outlet 19, optionally assisted by operating the second pump 33. Synchronously, the first pump 31 is actuated to supply new reactant-containing liquid to the first vessel 3 such that the sum of the liquid volume 15 in the first vessel 3 and the liquid volume 25 in the second vessel 5 remains substantially constant. This is achieved substantially isobarically by allowing the gas volumes 13, 23 in the first and second vessels 3, 5 to communicate freely through gas communication passage without pressure loss. In order to achieve isobaric conditions as closely as possible, preferably supplemental pressurized gas is fed to the vessels 3, 5 such as to compensate for solubility losses and gas consumed by the reaction itself, if any.

During this stage, the valve 14 is preferably maintained in a closed position. After the liquid transfers out of the second vessel 5 and into the first vessel 3 have respectively concluded, the liquid volume 15 in the first vessel 3 will be large while the liquid volume 25 in the second vessel 5 will be low. By now opening valve 14, and preferably closing liquid inlets 7 and 19, the second vessel 5 is replenished with reactant-containing liquid from the first vessel 3 through the liquid communication passage 16. Simultaneously, gas may flow freely between the gas volumes 13, 23 such that constant pressure is maintained within the system of the two vessels 3, 5. The liquid movement is indicated by arrows $P_1$ and $P_2$ during the liquid transfer phase. During that phase, gas flows in the direction of arrow $P_4$. In the ensuing phase, when liquid is transferred from the first vessel 3 to the second vessel 5 in the direction of arrow $P_3$, gas flows in the direction of arrow $P_5$.

Particularly preferred, the apparatus 1 comprises a control device 37 which is in signal communication with the first pump 31 and the optional second pump 33, or with optional control valves associated with the respective inlets and outlets of the vessels 3, 5 (control valves not shown) and preferably also with the valve 14 in order to administer the operation of the first and second pumps 31, 33 and, if necessary, the valve 14 to carry out the method described hereinabove.

FIG. 2 shows a modified apparatus 1' for performing a chemical reaction under elevated pressure. The apparatus 1' is structurally and systematically very similar to apparatus 1 shown in FIG. 1. Apparatus 1' may also comprise a control device 37 in the manner shown in FIG. 1 which, however, has been omitted from FIG. 2 for ease of legibility. The apparatus 1' differs from the apparatus 1 shown in FIG. 1 in that the second vessel 5 comprises a dip tube 39 that is connected to the liquid outlet 19 of the second vessel 5 and extends into the second vessel 5 to a predetermined depth. This setup is considered particularly beneficial whenever the reaction product contains multiple liquid phases, and thus the liquid volume inside the second vessel is split into volume portions 25a, b. With the dip tube 39, it is possible to selectively remove only a desired liquid phase or number of liquid phases from the second vessel 5. This is particularly advantageous when the reaction-product is not equally distributed among all liquid phases, but predominantly or exclusively resides within one liquid phase or a select number of liquid phases. It shall be understood that while not explicitly shown, also the apparatus of FIG. 1 may comprise a dip tube connected to the corresponding liquid outlet of the second vessel 5.

The operation is however essentially identical to the operation of the apparatus 1 shown in FIG. 1.

While the embodiments shown in FIGS. 1 and 2 relate to an apparatus having one reactor vessel, namely the second vessel 5, and one buffer vessel, namely the first vessel 3, the embodiments shown in FIGS. 3 and 4 have a slightly deviating functional principle. The apparatus 1" shown in FIG. 3 and the apparatus 1''' shown in FIG. 4 comprise two reactor vessels 3, 5, respectively. In other words, in addition to the second vessel 5, also the first vessel 3 is a reactor vessel. The two vessels 3, 5 are operated alternatingly. An efficient liquid supply is achieved by providing a liquid manifold 47 to which both inlets 7, 17 of the first vessel 3 and second vessel 5 are connected. Similarly, the outlets 9, 19 of the first and second vessels 3, 5 are connected to a liquid outlet manifold 49.

The apparatus 1" and 1''' respectively comprise a dedicated gas inlet suitably positioned and connected to the gas ports 11, 21 associated with the first and second vessels 3, 5. The gas ports 11, 21 are thus also configured to receive pressurized gas, preferably reactant-containing gas from a source 45 of said gas.

The liquid inlet 7 of the first vessel 3 is associated with a valve 8, preferably a control valve. The liquid inlet 17 of the second vessel 5 is associated with a valve, preferably control valve 18.

Both liquid outlets 9, 19 are associated with an outlet valve arrangement 20, which may, as depicted, be formed as a manifold valve or an assembly of multiple separate valves.

In operation, one of the two vessels 3, 5, for example the first vessel 3 is initially supplied with pressurized reactant-containing liquid and gas depending on the size of the vessels 3, 5, also the second vessel 3, 5 is provided with some pressurized liquid but mainly with gas. The amount of the reactant-containing liquid in the second vessel 5 will initially be lower than in the first vessel 3.

Subsequently, reaction conditions are provided in the first vessel 3 and the reaction, preferably a carbonylation reaction, hydrogenation reaction or hydroformylation reaction as mentioned herein above, is effected. After a predetermined amount of reaction product has formed, preferably when the reaction has concluded, the outlet valve 20 is operated such that liquid may be withdrawn from the first vessel 3 and simultaneously, the inlet valve 18 associated with the liquid inlet 17 of the second vessel 5 is opened such that liquid may flow in the direction of arrow $P_8$ into the second vessel 5. This is preferably achieved by operating the first and second pumps 31, 33, respectively. The flow rate provided by the first and second pumps preferably is such that the amount of liquid withdrawn from the first vessel 3 is equal to the amount of liquid supplied to the second vessel 5. After replenishing the second vessel 5 with reactant-containing liquid, the necessary amount of pressurized gas is resupplied until the pressure inside the gas volume 13, 23 maintains a predetermined level. This may also occur continuously during the operation of the apparatus 1", 1'".

While liquid is withdrawn from the first vessel 3 and supplied to the second vessel 5, gas flows in the direction of arrow $P_{10}$.

Next, the second vessel 5 is ready for performing the chemical reaction. After a predetermined amount of reaction product has formed, preferably when the reaction has concluded, in the second vessel 5, a liquid exchange is performed by withdrawing product-containing liquid from the second vessel 5 in the direction of arrow $P_7$, and supplying reactant-containing liquid in the direction in arrow $P_6$ to the first vessel 3 again by operating the first and second pumps 31, 33 and switching the valves 8, 20 correspondingly.

The embodiment of apparatus 1'" shown in FIG. 4 is structurally and systematically similar to the apparatus 1" shown in FIG. 3, with the exception of both vessels 3, 5 being shown as containing multiple liquid phases after a predetermined amount of reaction product has formed, preferably when the reaction has concluded. Similar to the operation of FIG. 2, both vessels 3, 5 comprise dip tubes 39, 40 associated with the respective liquid outlet 9, 19 of the vessels 3, 5 which extend into the vessel to a predetermined depth which allows for selectively removing the desired liquid phase or phases. It shall be understood that while not explicitly shown, also the apparatus 1" of FIG. 3 may comprise a dip tube connected to the corresponding liquid outlet of the second vessel.

Generally for all embodiments making use of a dip tube in the reactor vessel, it shall be understood that the second vessel may comprise one or more additional liquid outlets to withdraw material from the vessel that is not extracted through the respective dip tube which are not shown in an effort to keep the drawings easily legible. If for example, the dip tube is used to extract only a desired phase or portion of material from the reactor vessel, the remaining material will eventually be withdrawn through the suitably positioned additional liquid outlet or outlets.

The preferred embodiments shown in FIGS. 1 to 4 relate to an apparatus 1, 1', 1", 1'" having a first vessel 3 and a second vessel 5. The invention is, however, not limited to operating exclusively two vessels. Likewise, it is within the scope of the invention to operate an apparatus having more than two vessels while still adhering to the general teaching shown in the embodiments described hereinabove. Insofar, mentioning a plurality of objects does not exclude an apparatus comprising more than those objects.

The invention claimed is:

1. A method of performing a chemical reaction under elevated pressure, the method comprising:
   pressurizing a first vessel and a second vessel with i) reactant-containing liquid and ii) gas to a predetermined pressure,
   providing reaction conditions in at least one of the first vessel and the second vessel such that the chemical reaction is effected and a product-containing liquid is obtained,
   withdrawing the product-containing liquid from the respective vessel when a predetermined amount of product has been produced, and
   simultaneously supplying reactant-containing liquid to the respective other vessel, wherein the first vessel and the second vessel are in fluid communication by way of a gas communication passage, and at the same time the first vessel and the second vessel are not in liquid fluid communication.

2. The method of claim 1,
   wherein withdrawing the product-containing liquid is effected at a predetermined withdrawal flow rate, and supplying the reactant-containing liquid is effected at a predetermined feed flow rate, the feed flow rate being substantially equal to the withdrawal flow rate.

3. The method of claim 1,
   wherein providing reaction conditions such that the chemical reaction is effected and a product-containing liquid is obtained is performed in the second vessel, and the method further comprises:
   supplying reactant-containing liquid from the first vessel to the second vessel after withdrawing the product-containing liquid from the second vessel.

4. The method of claim 3,
   wherein supplying the reactant-containing liquid from the first vessel to the second vessel is effected by gravity.

5. The method of claim 3,
   wherein supplying the reactant-containing liquid from the first vessel to the second vessel is effected by or assisted by a fluid conveying device.

6. The method of claim 1,
   wherein providing reaction conditions such that the chemical reaction is effected and a product-containing liquid is obtained is alternatingly performed in both the first vessel and the second vessel.

7. The method of claim 1,
   wherein the gas comprises a reactant-containing gas comprising at least one of: carbon monoxide for effecting a carbonylation reaction, or hydrogen for effecting a hydroformylation or hydrogenation reaction.

8. The method of claim 1,
   wherein the reactant-containing liquid comprises an alcohol.

9. The method of claim 1, further comprising:
   determining if the pressure in the first vessel and the second vessel drops below the predetermined pressure, and
   replenishing gas to the first vessel and the second vessel until the predetermined pressure is reached again.

10. The method of claim 1,
    wherein after the predetermined amount of product has been produced in the respective vessel, the respective vessel contains several liquid phases, and the method further comprises:
    separately withdrawing a select liquid phase or phases from the respective vessel.

11. The method of claim 7,
    wherein the reactant-containing liquid, the gas and the reaction conditions are selected such that a carbonylation reaction is performed.

12. The method of claim 1,
    wherein the reaction is effected in the presence of a catalyst.

13. The method of claim 1,
    wherein the reactant-containing liquid, the gas and the reaction conditions are selected such that a carbonylation product, a hydrogenation product or a hydroformylation product is produced.

14. A method of performing a chemical reaction under elevated pressure, the method comprising:
    pressurizing a first vessel and a second vessel with i) reactant-containing liquid and ii) gas to a predetermined pressure,
    providing reaction conditions in one of the first vessel and the second vessel such that the chemical reaction is effected and a product-containing liquid is obtained, wherein providing reaction conditions such that the chemical reaction is effected and a product-containing liquid is obtained is alternatingly performed in both the first vessel and the second vessel, withdrawing the product-containing liquid from the respective vessel when a predetermined amount of product has been produced, and simultaneously supplying reactant-containing liquid to the respective other vessel, wherein the first vessel and the second vessel are in fluid communication by way of a gas communication passage.

15. The method of claim 14,
wherein withdrawing the product-containing liquid is effected at a predetermined withdrawal flow rate, and supplying the reactant-containing liquid is effected at a predetermined feed flow rate, the feed flow rate being substantially equal to the withdrawal flow rate.

16. The method of claim 14,
wherein the gas comprises a reactant-containing gas comprising at least one of: carbon monoxide for effecting a carbonylation reaction, or hydrogen for effecting a hydroformylation or hydrogenation reaction.

17. The method of claim 14,
wherein the reactant-containing liquid comprises an alcohol.

18. The method of claim 14, further comprising:
determining if the pressure in the first vessel and the second vessel drops below the predetermined pressure, and
replenishing gas to the first vessel and the second vessel until the predetermined pressure is reached again.

19. The method of claim 14,
wherein after the predetermined amount of product has been produced in the respective vessel, the respective vessel contains several liquid phases, and the method further comprises:
separately withdrawing a select liquid phase or phases from the respective vessel.

20. The method of claim 16,
wherein the reactant-containing liquid, the gas and the reaction conditions are selected such that a carbonylation reaction is performed.

21. The method of claim 14,
wherein the reaction is effected in the presence of a catalyst.

22. The method of claim 14,
wherein the reactant-containing liquid, the gas and the reaction conditions are selected such that a carbonylation product, a hydrogenation product or a hydroformylation product is produced.

* * * * *